Feb. 25, 1941.　　F. B. HEWEL　　2,233,132
WHEEL BRAKE
Filed Nov. 12, 1937　　2 Sheets-Sheet 1
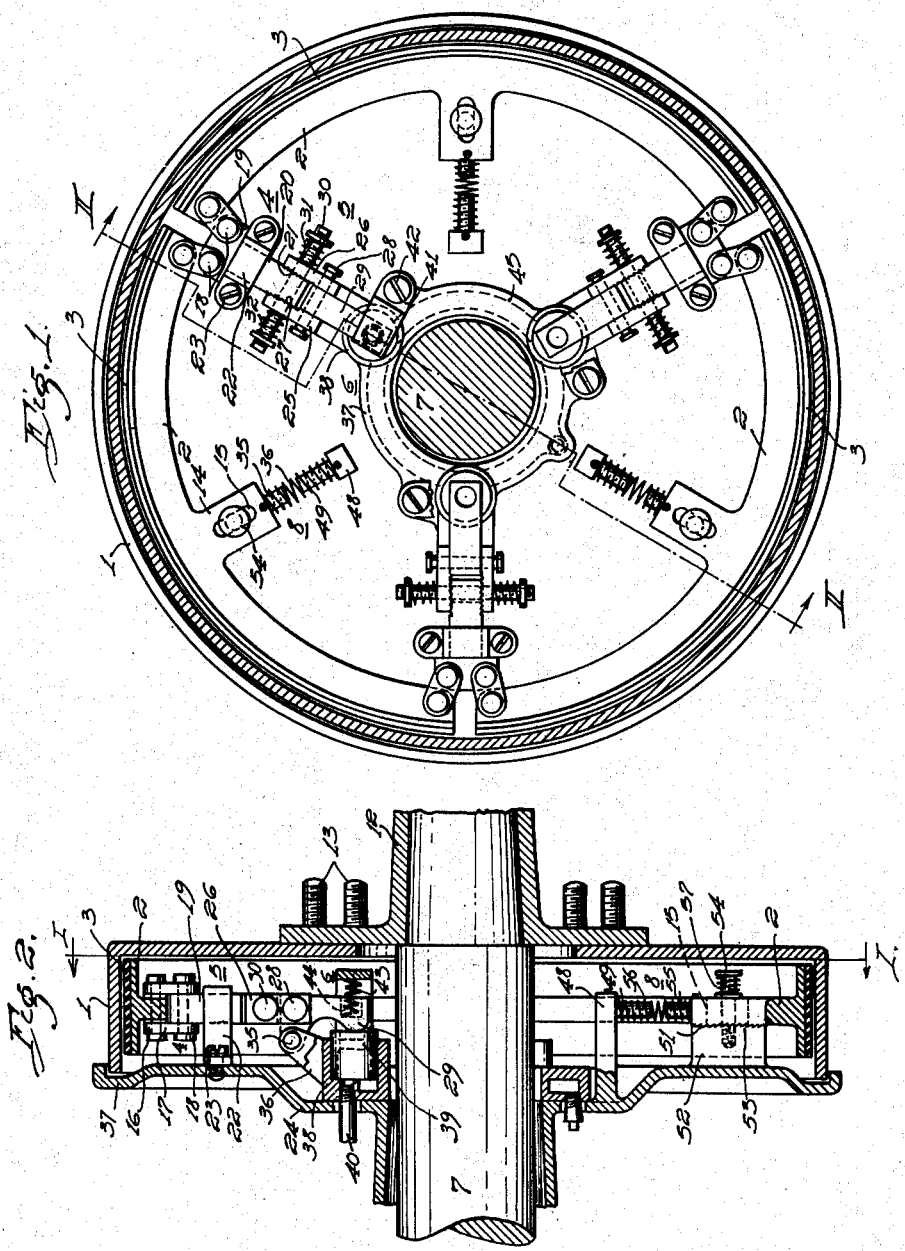
WITNESSES:
INVENTOR
Frank B. Hewel.
BY
William R. Coley
ATTORNEY

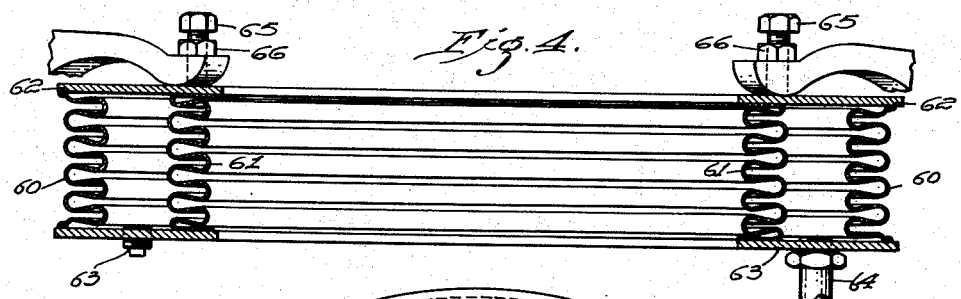
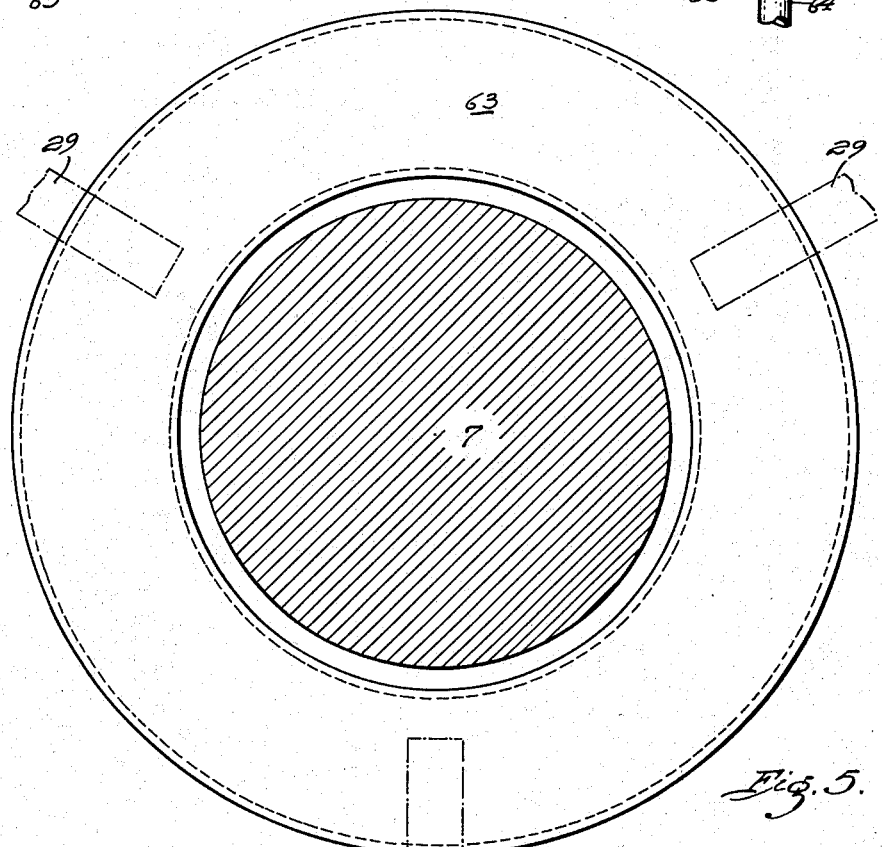
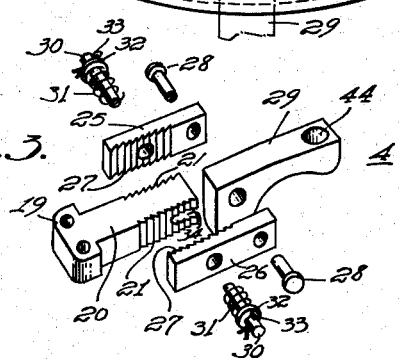

Patented Feb. 25, 1941

2,233,132

UNITED STATES PATENT OFFICE 2,233,132

WHEEL BRAKE

Frank B. Hewel, Pittsburgh, Pa.

Application November 12, 1937, Serial No. 174,168

6 Claims. (Cl. 188—79.5)

My invention relates to wheel brakes, and it has particular reference to fluid-pressure-operated brakes for automobiles and the like.

One object of my invention is to provide a wheel brake having a plurality, preferably three, of end-to-end disposed outwardly movable braking members, together with centrally-located fluid-pressure-operated means for actuating a plurality, preferably three, of thrust devices to concurrently operate upon the confronting ends of the braking members and thus provide a suitable braking action.

More specifically, another object of my invention is to provide a structure of the character just set forth in which are embodied a plurality, preferably three, of thrust linkages, each having a pair of arms pivotally connected to the respective pairs of confronting ends of the braking members and each having a pivotally mounted cam member acted upon by fluid-pressure-operated means to force the corresponding linkage outwardly.

Another object of my invention is to provide a brake of the type set forth above, together with resilient means respectively attached to substantially the mid-points of the braking members for inwardly retracting the same upon release of the fluid pressure.

A further object of my invention is to provide a wheel brake having a plurality of movable braking members and longitudinally-operable means for actuating the same, wear upon the braking members being automatically compensated for to maintain proper braking pressure with a substantially constant length of stroke of the operable means.

Still another object of my invention is to provide a wheel brake of the type just set forth in which the automatic compensation is effected by means of spring-biased ratchet means cooperating with the operable means for automatically effecting a tooth-slipping action to produce the desired result.

Another object of my invention is to provide a wheel brake having a plurality of braking members, together with resilient means for withdrawing the members from the brake drum after a brake application, wear upon the braking members being automatically compensated for to maintain substantially the same withdrawal distance between the drum and the braking members.

Still another object of my invention is to provide an expansible fluid-operated structure comprising a plurality of bellows, one located within another.

Other objects of my invention will become evident from the following detailed description taken in conjunction with the accompanying drawings, wherein:

Figure 1 is a view in front elevation of a fluid-pressure-operated wheel brake constructed in accordance with my present invention;

Fig. 2 is a view in transverse section taken along the broken line II—II of Fig. 1;

Fig. 3 is an exploded view in perspective of a part of the mechanism shown in Figs. 1 and 2;

Fig. 4 is a view in longitudinal section of a modified form of fluid-pressure-operated device applicable to my present invention; and Fig. 5 is a view in front elevation of the device shown in Fig. 4.

Referring to the drawings, the structure here shown comprises a suitable brake drum 1 within which are located a plurality, specifically three, of arcuate end-to-end disposed braking members 2 or segments 2 provided with suitable strips of brake lining 3 on their peripheral faces, together with a corresponding number, namely, three, thrust linkages 4 connected to the confronting ends of the braking members, automatic wear-compensating mechanisms 5 to produce the desired braking action while maintaining a substantially constant length of stroke of the respective fluid-pressure-operated devices 6 which are grouped around the centrally-located wheel axle or shaft 7, and resilient mechanisms 8 for effecting a withdrawal of the braking members 2 after release of the fluid pressure and for automatically compensating for wear of the corresponding brake linings, as subsequently set forth in detail.

It will be understood that, while I have not shown the complete details of the wheels of an automotive vehicle or the like to which my invention is applicable, such illustration is not necessary, inasmuch as my invention is adapted to be applied to any wheeled shaft.

As shown, the brake drum 1, which is in general cup-shaped, has its bottom or disk attached by means of bolts 13, for example, to the bearing member 12, of any well-known type, for the shaft 7, so that the brake drum is held in operative rotatable position, in accordance with usual practice. Each braking member 2 is provided with a centrally-located inwardly-extending lug 14 having a slot 15 therein for cooperation with the corresponding resilient mechanism 8, as hereinafter set forth in detail.

Each braking member 2 is provided at its ends with openings for receiving pivots or bolts 16 to which are secured short diverging links 17, the other ends of which are attached by means of suitable pivots or bolts 18 to the substantially rectangular head 19 of a bar 20 having ratchet teeth 21 on opposing faces, as shown in more detail in Fig. 3. A similar construction is employed in connection with the confronting ends of each pair of the braking members, so that three thrust linkages, each including the bar 20 and the short links 17, are substantially equally spaced around the wheel. The innermost position of head 19 of bolt 20 is determined by a strap 22 passing around bar 20 and having screws 23 for attachment to backing disc or frame 24 of the brake assembly, which disc is provided with a peripheral flange 37.

A plurality of short bars 25 and 26 having ratchet teeth 27 on their inner sides are disposed to cooperate with the ratchet-toothed faces of bar 20. A pivot or pin 28 having a head on both ends extends through openings near the inner ends of the toothed bars 25 and 26 for pivoting the same upon an outer end of a movable cam member 29, as hereinafter more fully set forth. Near their outer ends, the toothed bars 25 and 26 are pierced by a second rod 30 which likewise passes through a slot 34 in the inner end of bar 20, and a plurality of helical springs 31 and 32 are disposed near the outer ends of the pin 30, being held in position by washers 32 and cotter pins 33, the thrust of these springs serving to resiliently hold the toothed bars 25 and 26 in proper engagement with the toothed faces of the bar 20.

It will be noted that the slope and shape of the cooperating ratchet teeth on bar 20 and short bars 25 and 26 are such that the teeth interlock when force is applied outwardly to set the brake, but may slide over each other when withdrawn inwardly, for a purpose to be set forth.

Each of the three cam members 29, in addition to being pivotally related to the corresponding toothed bars 25 and 26 as previously described, has a laterally-projecting lug pivotally mounted at 35 on an arm 36 associated with the corresponding stationary cylinder 38 of a fluid-pressure-operated device 6, as best shown in Fig. 2. The pivot 35 is preferably disposed slightly farther away from the piston 39 than is the pivot 28, to provide a satisfactory thrusting action.

The three cylinders 38 are substantially equally spaced around the shaft 7, being rigidly connected together by means of a suitable ring or yoke 45 which loosely fits around the shaft 7.

A suitable piston 39 is disposed in each of the cylinders 38, and suitable inlet pipes 40 are provided for permitting the ingress and egress of oil or other fluid which it is desired to employ for operating the illustrated brake.

The inner or unpivoted end of each cam member 29 is curved in shape and rests against the inner flat base of the corresponding piston 39, whereby the cam member is rotated around its pivot 35 and forces outwardly the associated parts, namely, toothed members 25 and 26 and toothed bar 20, together with its outer links 17, whereby the movement of each piston 39 causes a thrust motion of the linkage in question and forces the braking segments outwardly into contact with the brake drum by reason of the application of such thrust at each end of each braking member.

To suitably retract each cam member 29 when the fluid pressure is released, a spring 43 having one end fitting within a socket 44 in the lower end of the cam member 29 has its other end resting against a bar or strip 41 suitably secured by a bolt 42, for example, to the ring 45. It will be appreciated that various other positions and types of springs may be employed and that the spring 43 is shown for illustrative purposes only, its function being to return the corresponding piston 39 to its initial illustrated position upon release of fluid pressure thereon.

The backing disk 24 is provided with three laterally extending arms 48 each having a small pin or cylinder 49 attached near the outer end thereof and extending at substantially right angles thereto. The above-mentioned inwardly-projecting lugs 14 at the central points of each of the braking members are associated with the stationary arms 48 by means of a small pin or cylinder 55 around which, as well as the oppositely-located small pin or cylinder 49, a helical tension spring 56 is wound, having its ends respectively attached to members 14 and 48. The purpose of this spring is to withdraw the braking members 2 by resilient action upon the lugs 14 at substantially their mid points after the brake application has been completed.

To compensate for wear of the brake lining 3, each lug 14 is associated with a block 52 by means of ratchet-toothed surfaces 51 on the lug 14 and 53 on the block 52, as best shown in Fig. 2. A bolt 54 extends through the slot 15 of the lug 14 into the stationary block 52, and the two sets of teeth are normally held in interlocking position by means of a helical compression spring 57 interposed between the head of bolt 54 and lug 14.

It will be noted that the slope and shape of teeth 51 and 53 are such that they interlock when the tension spring 56 withdraws braking member 2, but may slide over each other when the lug 14 is moved outwardly, for a purpose set forth below.

The operation of the illustrated apparatus may be set forth as follows: Upon admission of suitable fluid under pressure through the three inlet pipes 40 to the three cylinders 38 and pistons 39 therewithin, the pistons move toward the right, as illustrated in Fig. 2, and force the lower ends of the corresponding cam members 29 toward the right against the action of the respective springs 43, the cam members thereby pivoting around pins 35 and forcing the bars 20 and links 17 outwardly in such manner as to cause the three braking members 2 to properly engage the brake drum, as previously described.

Upon release of the fluid pressure, the springs 43 drive the pistons 39 back into normal position, and the springs 56, acting on the lugs 14 at the mid points of the braking members 2, serve to retract the braking members from the drum.

It will be appreciated that my fluid-pressure brake provides a direct action of the shoes, ensuring relatively even wear of the brake linings, and because of the substantially continuous circular braking members, a relatively high area of brake lining contact is provided.

In order to automatically compensate for wear on the braking members, both with respect to maintaining a substantially constant length of stroke of the pistons and also maintaining a substantially constant radial distance or clearance between the brake drum 1 and each braking member 2, the illustrated ratchet-toothed devices 8 and 5 are employed.

In the case of the compensating means or resilient mechanisms 8, when the braking members 2 are forced outwardly to provide the brake application, the ratchet teeth 51 and 53 slide over each other as required to produce the desired pressure or zero distance between the brake drum and the brake lining, thus compensating for wear. When the fluid pressure is released, however, spring 56, acting on lugs 14, causes the teeth to interlock and withdraws the braking members to the desired distance (clearance) from the brake drum.

With respect to the device 5 associated with the thrust linkages 4, it will be noted that upon wear of the brake lining 3 and operation of the resilient mechanism 8, as described above, so that it becomes necessary for the thrust linkages to force the braking members 2 proper further outwardly, the ratchet teeth 27 on the bars 25 and 26, which are interlocked with teeth 21 of the bar 20 when braking force is applied, slide over the teeth 21 to lengthen the thrust mechanism to the extent required as springs 43 return pistons 39 to their normal position. The springs 31 and 32 yieldingly permit this sliding action, but upon the next outward thrust of the parts, the cooperating teeth interlock to provide the effect of a solid brake rod.

Thus, regardless of wear of the brake linings, the thrust and spring mechanisms always operate in the manner set forth to force the braking members to positions where satisfactory pressure is exerted between the braking members 2 and the brake drum 1.

In this way, wear of the brake members is automatically compensated for in two ways for the purpose of maintaining a substantially constant stroke of the fluid pressure pistons 39 and also the braking members are withdrawn the same distance from the brake drum at all times.

It will be understood that, if desired, the automatic wear-compensating means may be omitted without detracting from the braking action proper, any suitable form of arm or bolt being attached to the outer links 17 to provide a rigid connection upon which cam members 29 operate.

Referring to Figs. 4 and 5 showing a modification of the fluid-pressure-operated mechanism of the preceding figures, in lieu of the piston and cylinder illustrated therein, I employ a plurality of bellows 60 and 61, one entirely surrounding the other, and attach an annular member 62 to the movable end of the bellows which actuates the illustrated cam members 29. The other or stationary end of the bellows is provided with a similar annular member 63 through which a suitable inlet pipe 64 extends.

It will be noted that the structure shown in Fig. 4 readily permits assembly thereof around a central shaft 7, as indicated in Fig. 5, while at the same time the admission of fluid under pressure through pipe 64 to the annular cylindrical space between the two bellows 60 and 61 causes them to concurrently expand and force the annular disk 62 and the cam members 29 resting thereon outwardly in order to provide the same braking action as was provided by the triple piston and cylinder mechanisms of the preceding figures.

If desired, an equalization adjustment may be provided in connection with cam members 29, and one form is shown in Fig. 4, although this form or its equivalent may also be applied to the structure shown in the preceding figures. In Fig. 4, a screw 65 is threaded through the contact head of each cam member 29, being held in the desired location by a lock nut 66. It will be understood that the screw may be reversed if desired, a rounded head of the screw contacting the bellows.

It will be seen that I have thus provided a rugged and compact triple-operating thrust type wheel brake in which the wear of the brake shoes is automatically compensated for, both as regards maintaining a substantially constant length stroke of the fluid-pressure means and at the same time maintaining a substantially constant withdrawal distance between the brake drum and the braking members.

I do not wish to be restricted to the specific structural details or arrangement of parts herein set forth, as various further modifications thereof may be made without departing from the spirit and scope of my invention. I desire, therefore, that only such limitations shall be imposed thereon as are indicated in the appended claims.

I claim as my invention:

1. A wheel brake comprising a brake drum, a plurality of movable braking members, means associated with said braking members to compensate for wear thereof, substantially radially operable means for operating said members to produce a braking action on said drum, and biased means cooperating with said operable means for automatically effecting changes in the effective length thereof upon operation of the aforesaid compensating means, whereby to maintain proper braking pressure with a substantially constant length of stroke of said operable means.

2. A wheel brake comprising a brake drum, a plurality of movable braking members, means associated with said braking members to compensate for wear thereof, longitudinally operable means for operating said members to produce a braking action on said drum, said operable means including a rigid member and a plurality of separate spring-biased ratchet means cooperating with opposite sides thereof for automatically effecting a tooth-slipping action upon operation of the aforesaid compensating means, whereby to maintain proper braking pressure with a substantially constant length of stroke of said operable means.

3. A wheel brake comprising a brake drum, a plurality of movable braking members, means associated with said braking members to compensate for wear thereof, operating means for actuating said members to produce a braking action on said drum comprising two normally substantially alined rigid members, and a pair of spring-biased ratchet means pivotally mounted on opposite sides of one of said rigid members and having toothed engagement with corresponding opposite sides of the other rigid member for automatically effecting a tooth-slipping action upon operation of the aforesaid compensating means, whereby to maintain proper braking pressure with a substantially constant length of stroke of said operating means.

4. A wheel brake comprising a brake drum, a plurality of movable braking members, means for operating said members to produce a braking action on said drum, resilient means for withdrawing said members from said drum after a brake application, and means operable in the line of action of said resilient means for automatically compensating for wear upon said braking members to maintain substantially the same withdrawal distance between said drum and said members.

5. A wheel brake comprising a brake drum, a plurality of substantially radially movable braking members, means for operating said members to produce a braking action on said drum, resilient means for withdrawing said members from said drum after a brake application, and biased means cooperating with said resilient means for automatically effecting changes in the effective length thereof to compensate for wear upon said braking members and maintain substantially the same withdrawal distance between said drum and said members.

6. A wheel brake comprising a brake drum, a plurality of movable braking members, means for operating said members to produce a braking action on said drum, resilient means for withdrawing said members from said drum after a brake application, and spring-biased ratchet means operable in the line of action of said resilient means for automatically effecting a tooth-slipping action to compensate for wear upon said braking members and maintain substantially the same withdrawal distance between said drum and said members.

FRANK B. HEWEL.